4756X
Sheet 1, 3 Sheets.
G. Wilkinson.
Draw Bridge.
Patented May 15, 1827.
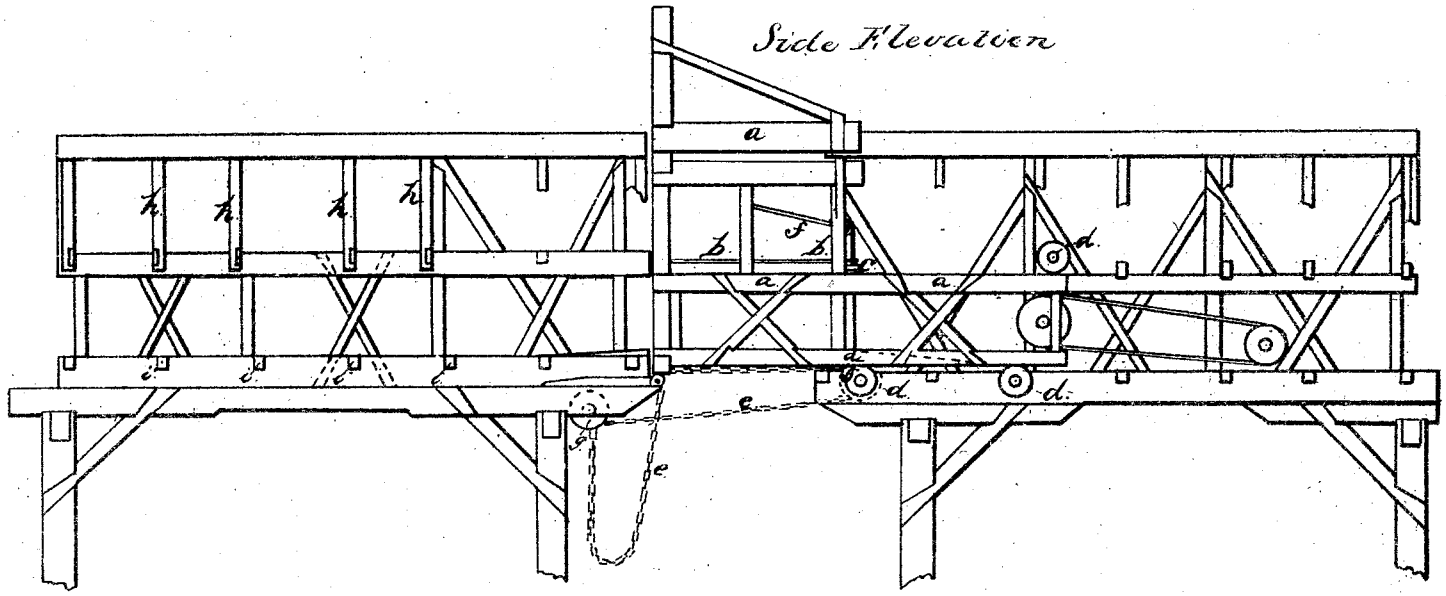

4756X
Sheet 2, 3 Sheets.
G. Wilkinson.
Draw Bridge.
Patented May 15, 1847.
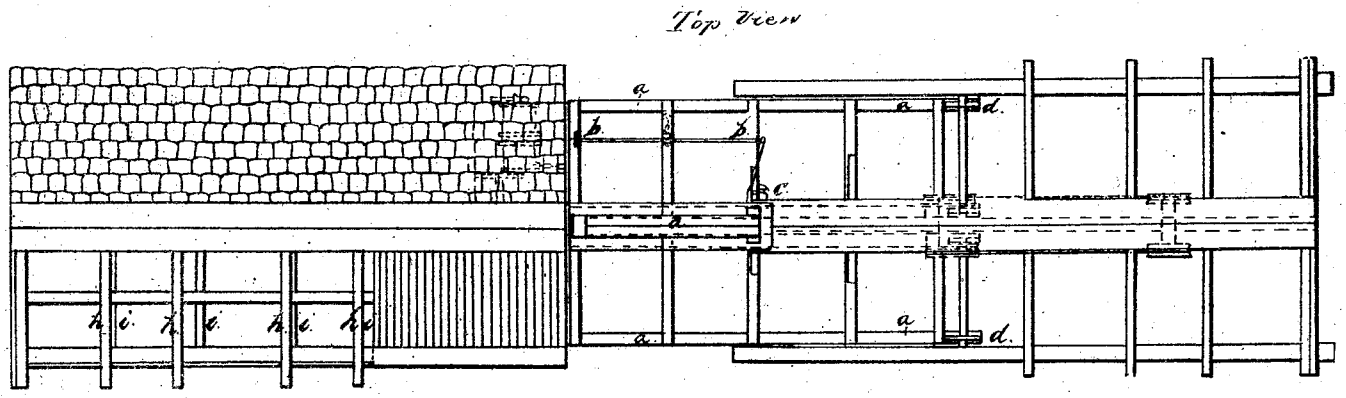

Sheet 3, 3 Sheets.
4756X
G. Wilkinson.
Draw Bridge.
Patented May 15, 1827.
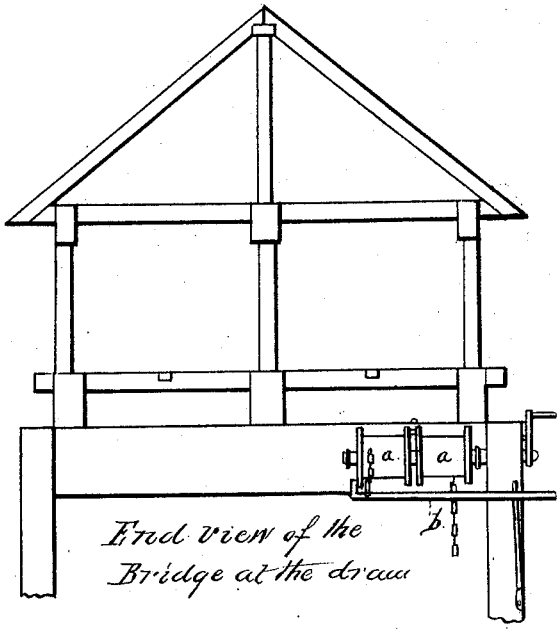
End view of the Bridge at the draw
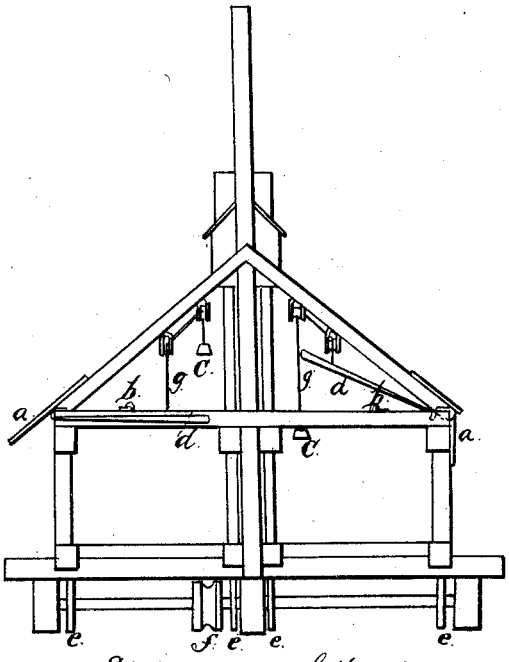
Side view of the draw
N. PETERS, PHOTO-LITHOGRAPHER, WASHINGTON, D. C.

United States Patent Office

PTO - BOYERS, PA Duty Station

MISSING PAGE TEMPORARY NOTICE

PATENT # 4756X FOR ISSUE DATE 5-15-1827

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa